United States Patent [19]

Dickinson

[11] 4,047,107

[45] Sept. 6, 1977

[54] PULSE WIDTH RESPONSIVE SECURITY SYSTEM

[75] Inventor: Harvey Frank Dickinson, Bramhall, England

[73] Assignee: Ferranti Limited, Hollinwood, England

[21] Appl. No.: 577,164

[22] Filed: May 14, 1975

[30] Foreign Application Priority Data

May 18, 1974 United Kingdom ............... 22281/74

[51] Int. Cl.² .............................................. H04B 1/00
[52] U.S. Cl. ........................................ 325/37; 325/32; 325/142; 340/167 A
[58] Field of Search ............................ 325/142, 37, 32; 340/167 A, 274 C; 317/134; 343/225, 228, 203; 179/15 AW

[56] References Cited

U.S. PATENT DOCUMENTS

| | | | |
|---|---|---|---|
| 2,951,906 | 9/1960 | Brown | 179/15 AW |
| 3,257,651 | 6/1966 | Feisel | 179/15 AW |
| 3,392,559 | 7/1968 | Hedin et al. | 340/274 C |
| 3,626,373 | 12/1971 | Wilcox | 340/167 A |
| 3,806,872 | 4/1974 | Odom | 340/167 A |
| 3,858,116 | 12/1974 | Friedl | 340/167 A |
| 3,906,348 | 9/1975 | Willmott | 325/37 |
| 3,973,241 | 8/1976 | Streckenbach | 340/167 A |

Primary Examiner—Benedict V. Safourek
Assistant Examiner—Michael A. Masinick
Attorney, Agent, or Firm—Cameron, Kerkam, Sutton, Stowell & Stowell

[57] ABSTRACT

A security system comprises electronic means for generating a group of pulses of predetermined frequency, which group has a unique identity specified by the particular durations of its constituent pulses; means for transmitting that group of pulses; means for receiving that group of pulses; and means responsive to that received group of pulses only when it has said unique identity. Preferably the pulses are bursts of high frequency waves, and the means responsive to received pulses includes means for establishing tolerance intervals for the ends of corresponding pulses.

13 Claims, 5 Drawing Figures

PULSE WIDTH RESPONSIVE SECURITY SYSTEM

The invention relates to security systems.

It is frequently desired to restrict access to a place (e.g. a document store), machine (e.g. a motor vehicle), or system (e.g. computer input/output). A mechanical lock and key system has the disadvantage that it is too easy to replicate the key. To be viable, alternative electronic systems should not require a 'key' that is significantly more inconvenient to carry round than a mechanical key, and, in order to confer significant advantage, would also need to conceal its structure and detailed operational specification in order to be difficult to replicate. It is envisaged that a system suitable for embodiment using semiconductor integrated circuitry could meet such requirements.

According to the one aspect of the invention there is provided a security system that utilises groups of electronically generated pulses of predetermined frequency, each of the groups being uniquely identified by the durations of its constituent pulses, preferably appearing sequentially.

Such a system would use a portable transmitter as a 'key' and fixed receiver as a 'lock' and, advantageously, both are readily embodied using semiconductor integrated circuits.

According to another aspect of the invention a security system transmitter comprises a high frequency wave-generator, a tuned printed circuit aerial and gating means between the generator and the aerial, the gating means being operative to pass a predetermined number of pulses of generator output such pulses having durations set by corresponding resistor values.

The generator may supply high frequency r.f., or could be an ultrasonic or other convenient source. In some cases it might be incorporated in the same integrated circuit as the gating means, though a more generally applicable chip results if it is not.

The resistors are conveniently in alternative feed paths to a single capacitor to establish the durations of the said pulses, respectively. Such feed paths, may be enabled sequentially by pulses from a clock source, the capacitor being connected to one input of a differential amplifier having a reference voltage applied to its other input so that its output will change when the capacitor reaches a predetermined voltage. The capacitor may be discharged either from clock pulses or from the output change of the differential amplifier.

Such a clock and differential amplifier are readily embodied together with appropriate gating in a single semiconductor chip. Mounting such a chip together with an appropriate generator on a printed circuit board also presenting the aerial and bearing the generator, a tuning capacitor, the resistors and the charging capacitor with appropriate packaging will allow realisation of a conveniently small article for a person to carry round.

Use of the so-called collector diffusion isolation C.D.I. technology for the integrated circuit chip means that, if enabling of the capacitor discharge and resistor feedpaths is by emitter follower transistors, the small collector/emitter potential drop inherent in the technology will reduce the possibility of errors due to temperature changes as the predetermined charge voltage for the capacitor can be close to that set from the battery supply value.

According to a further aspect of the invention a security system receiver comprises means for detecting the start and finish of each of successive pulses of received high frequency signals, and a plurality of pulse width recognition stages corresponding to a particular sequence of pulse durations.

Preferably, each pulse width recognition stage includes means for establishing a predetermined tolerance time interval during which the corresponding pulse should terminate. The stages may be sequentially enabled with each (except the last) serving to enable the stage corresponding to the next pulse of the particular sequence.

Conveniently, each pulse width recognition stage includes a capacitor of the same value as that used in the transmitter and a corresponding resistor. Charging of the capacitor is initiated by the start of a received pulse and the capacitor voltage is applied to two differential amplifiers each supplied with a different reference voltage to give the predetermined tolerance interval according to the states of the amplifier outputs.

One system embodying the invention and using r.f. waves will now be described, by way of example, with reference to the accompanying drawings in which.

Figure 1:
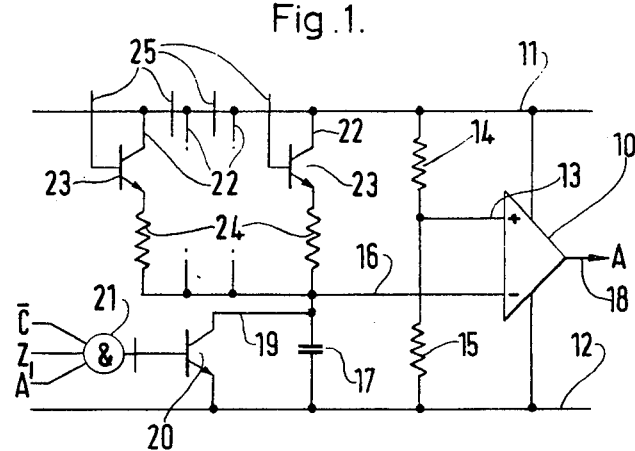
FIG. 1 is a circuit diagram of a pulse timing circuit for the transmitter of FIG. 2.

In FIG. 1, an operational amplifier 10 is shown connected between two voltage supply rails 11 and 12. The amplifier 10 has a first input 13 connected to a reference voltage level set by resistors 14 and 15 connected in series between the supply rails, and a second input 16 connected to one side of a capacitor 17 having the other side connected to the lower supply rail 12. The amplifier 10 is operative on a differential basis so that its output 18 (also labelled) A) will change its state on transitions of the relative voltage levels at its inputs 13 and 16).

The capacitor 17 has a rapid discharge path 19 via a transistor 20 to the lower voltage rail 12. The conduction state of the transistor 20 is controlled by the output of a coincidence gate 21 as will be described. A plurality (in this case four) of charging paths 22 are shown for the capacitor from the other voltage rail 11. Each charging path includes a transistor 23 and a resistor 24. The transistors are rendered conducting in sequence, one at a time, by appropriate energisation of their bases via lines 25.

The resistors 24 have predetermined values and so give corresponding charging rates for the capacitor 17. This means that the values of the resistors 24 determine the intervals between (a) starting to change the capacitor 17 from its discharged condition and (b) reaching the state where the voltage level at the second input 16 of the amplifier 10 matches or exceeds that of the first input 13 to change the state of the amplifier output 18. It is envisaged that a wide range of resistor values will be usable, for example 1 Kohm to 1 Mohm, with approximately 20% difference between allowable values. As will become clear the preferred receiver (FIG. 5) provides for sequential detection of pulses corresponding to these intervals so that the resistors 24 need not be all different in each possible coded combination.

The capacitor discharge control gate 21 is shown with three inputs labelled A', Z and $\bar{C}$ and an inversion bar is shown on its output. The input A' is intended to indicate that the discharge capacitor path 19 is held open after transitions of the amplifier output 18 indicating that the reference voltage level on the first input 13 has been reached or exceeded by the capacitor voltage on the second input 16. As will be understood from the description of FIG. 2 the gate inputs $\overline{C}$ and Z are intended to show that the capacitor discharge path is also momentarily closed upon an initiation of a charge cycle by a clock pulse and is maintained closed after completion of energisation of the sequence of charging 21, respectively.

Figure 2:
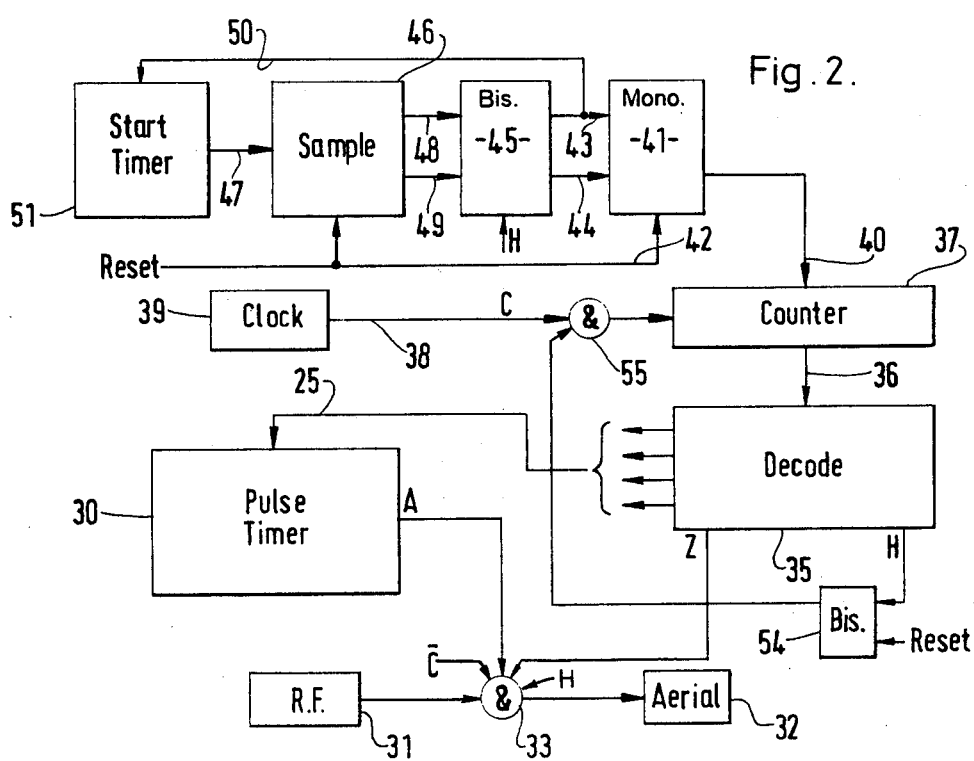
FIG. 2 is a block diagram of a typical transmitter.

As shown in FIG. 2, the output A of the amplifier 10 is used to control the passage of a high frequency signal from a source 31 to an aerial 32 via a gating arrangement 33 so as to provide successive r.f. pulses of durations determined by the resistors 24 (FIG. 1). The circuit of FIG. 1 is thus represented in FIG. 2 by block 30 labelled "pulse timer".

Charge path control signals for line 25 are generated by a binary to one-out-of $n$ (in this case four) decoder 35 connected to receive outputs 36 from a binary counter 37 fed with clock pulses over line 38 from an appropriate generator 39. Conveniently, the counter 37 has three stages and the decoder 35 comprises inverting gates for the counter outputs 36 and three-input coincidence gates for different combinations of true and inverted counter outputs. Four of the latter gates will be enabled in sequence to provide the signals for lines 25, a preceding gate (say responsive to all-zero) conveniently provides a transmission preparation output Z, and a succeeding gate (say decoding binary 101) conveniently provides a transmission termination output H. The latter is used to reset a bistable device 54 the output of which then blocks gate 55 in the clock line 38 to counter 37.

The counter 37 is connected to be reset by an output 40 of a monostable device 41, in order to cause energisation of decoder output Z following a short reset pulse on line 42, which also sets the device 54 to allow clock pulses to reach the counter 37. The device 41 is controlled by outputs 43 and 44 from a bistable device 45 which is used to hold the monostable device in its "rest" state, unless predetermined start conditions are met for the transmitter. Once these are met the bistable device 45 will change its state and place the monostable 41 in its other state from which it can be temporarily switched by the reset pulse on line 42. In general, the state of the device 41 represents that of the bistable 45 except for the duration of the reset pulse which is overriding.

If no restrictions are to be placed on starting the transmitter, the bistable device 45 will not be required. However, assuming some such restriction, a sampling circuit 46 is shown which is responsive to the reset signal and to an input signal on line 47 representative of whether or not conditions constituting said restrictions are satisfied to provide bistable device determining signals on lines 48 and 49. In the particular embodiment of FIG. 2 the start restrictions concern a minimum interval between successive transmitter operations and/or a maximum length of time that any one transmitter operation may last. Such criteria may be set up using predetermined charge and discharge rate paths for a further capacitor, a differential amplifier, and a charge current diversion path, for example controlled by one of the outputs of the bistable device 45 over line 50 to a start control timer 51.

Figure 3:
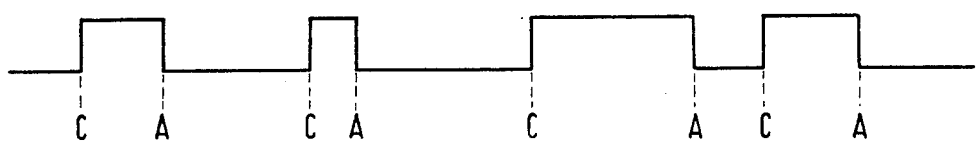
FIG. 3 is an idealised graph of r.f. envelope against time of a typical transmitter output.

FIG. 3 shows four square pulses of different lengths having equally spaced start times corresponding to clock pulse initiated selections of different ones of the charge paths 22 of FIG. 1, and finish times corresponding to subsequent transitions in the output of the amplifier 10. These square pulses represent idealised envelopes of a continuous sine wave signal from the source 31 chopped by the gate 33.

With the exception of the resistors 24, capacitor 17, aerial 32, a capacitor and resistor for the clock 39 and any capacitior in the start timer 51 the entire circuitry of FIG. 2 can be embodied in a single large scale integrated (L.S.I.) circuit. It may be possible to incorporate the resistors 24 with such a chip, though then it is unlikely that 20% differences between resistors could be realised. This would decrease the number of possible pulse codings and would increase fabrication costs, but would increase security. Also, the r.f. or other signal source may, and usually will, be separate.

Normally, the aerial can be printed on a small circuit board carrying the chip or chips and associated capacitor(s) and resistors. A small aerial tuning capacitor may be required. Such as arrangement will generally be acceptable because it is anticipated that a very small range will be required for the transmitter, e.g. for disabling a burglar alarm, or unlocking a car door, or giving access to a computer system.

It is intended that collector diffusion isolation (CDI) techniques be used for the integrated circuit. Other integrated circuit technologies could be used, but CDI affords substantial advantages both with regard to chip size and to the technology permitting emitter-follower action of transistors (e.g. the resistor selection transistor 23) with very small potential drops across them so that charging voltage may be closer to that set from the battery source and so produce less proportioniate variation for temperature etc.

Figure 4:
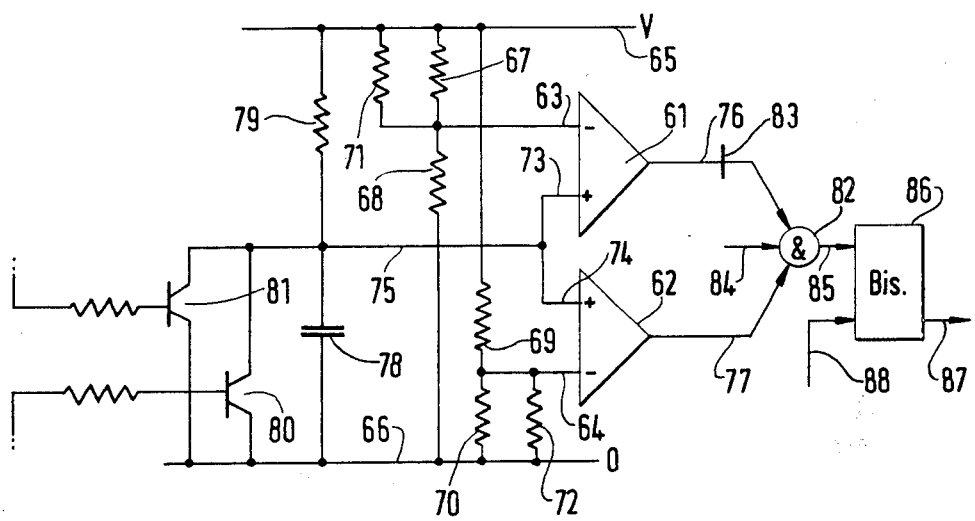
FIG. 4 is a circuit diagram of a pulse width recognition circuit for the receiver of FIG. 5.

A pulse width recognition circuit for a receiver embodying the invention is shown in FIG. 4. Two different amplifiers 61 and 62 are shown having reference voltage levels applied to similar input terminals 63 and 64, respectively, via resistor networks tied to different ones of voltage supply rails, 65 and 66, respectively. The resistor networks comprises four equal resistors 67 to 70 connected in two series pairs 67, 68 and 69, 70 between the supply rails 65 and 66 and feeding amplifier inputs 63 and 64, respectively. One resistor, 67 and 70, of each pair is bridged by other equal but much larger resistors 71 and 72, respectively. The reference voltage levels for the two amplifiers 61 and 62 will therefore deviate oppositely from a nominal level represented by one resistor pair 67, 68 or 69, 70 alone.

This means that, if a rising voltage is applied to both of the other amplifier inputs 73 and 74 simultaneously via line 75, amplifier outputs 76 and 77 will change state at different values of the rising voltage. There will thus be a time interval between such changes of amplifier outputs states with amplifier 62 changing first. Such a rising voltage is made available from a capacitor 78 connected to be charged from the upper voltage rail 65 over a resistor 79 and to be discharged by switching ON of transistor 80 or transistor 81.

If the capacitor 78 has the same value as the capacitor 17 of FIG. 1 and the resistor 79 has the same value as one of the resistors 24 of FIG. 1, the circuit of FIG. 4 can be used to detect a pulse produced by that resistor 24 in the circuit of FIG. 2, assuming, of course, that the ratios of resistance values 67: 68, 69: 70 and 14: 15 are also the same.

To do this the capacitor 78 needs to be discharged at the leading edge of the pulse and then allowed to charge over resistor 79. If the pulse is not too short, the amplifier outputs 77 and 76 will change state in succession, and a coincidence gate 82 enabled by such a change of the output 77 and disabled by such a change of the output 76 (see inversion bar 83) will pass a pulse on line 85 and received from the receiver on line 84 and representing the trailing edge of the receive pulse.

The relative sizes of the resistors 67 to 70 and 71, 72 determine the tolerable variations from nominal of the length of the received pulse. Such tolerance is required to cope with manufacturing tolerances on the components of both transmitter and receiver and consequent (or other) inevitable operational discrepancies. However, the allowed variation from nominal should exclude the possibility of wrongly detecting the next closest resistors of the permitted set mentioned above in relation to the resistor 24.

The gate 82 has an output 85 that serves to set a bistable device 86 to change the state of its output 87. A reset line 88 is shown for reversing the bistable state on power switch-on.

Appropriate circuitry for doing this will now be described in relation to the complete receiver block diagram of FIG. 5.

Figure 5:
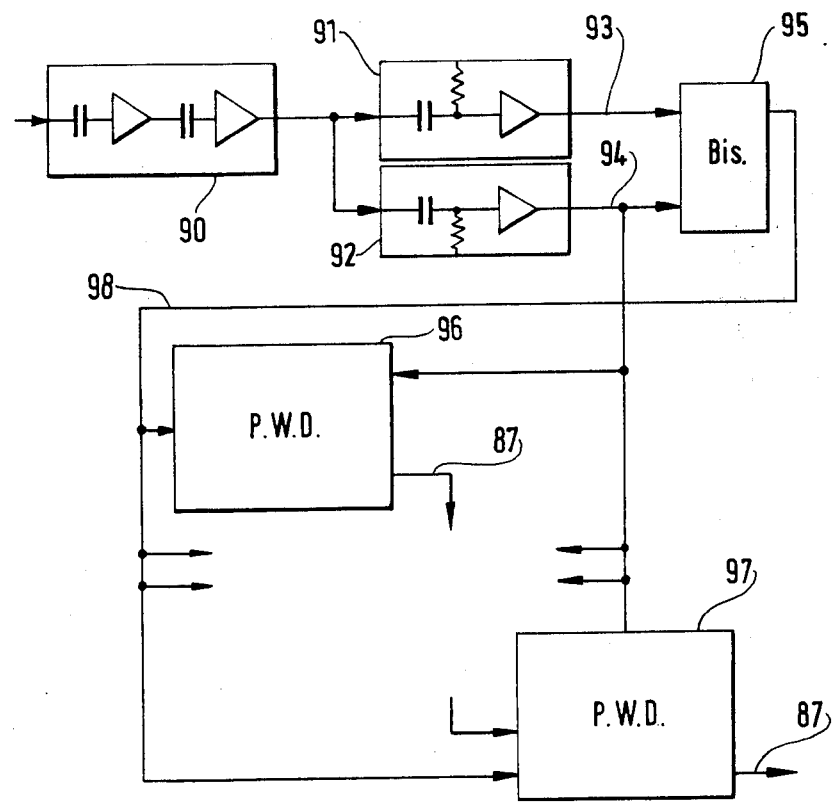
FIG. 5 is a block diagram of a typical receiver.

In FIG. 5 an a.c. coupler stage 90 is shown feeding the envelope of FIG. 3 to a pair of differentiating circuits 91 and 92 serving to detect the start and finish, respectively, of a received pulse of r.f. signal from the transmitter of FIG. 2. The differentiators 91 and 92 provide short duration pulses on lines 93 and 94, respectively, and these are used to set and reset a bistable device 95 to give a relatively sharp edged pulse corresponding to each received pulse (or burst) of r.f. signal.

FIG. 5 also shows two pulse width detection circuits 96 and 97 each similar to that shown in FIG. 4. In practice, of course, these detection circuits 96 and 97 are the first and last of four such circuits, one for each pulse of r.f. froam a transmitter of FIG. 2. The middle two circuits are omitted to avoid cluttering the drawing. The output from the bistable 95 is applied to all of the pulse width detection circuits as indicated by the arrowed branches from line 98, and serves to temporarily enable one of the capacitor discharge paths therein, say that controlled by the transistor 80. The outputs 87 of the bistable 86 of each pulse width detector except the last is taken to enable the other capacitor discharge path (i.e. via transistor 81) of the next detector circuit. Clearly, the first detector circuit 96 will not need such a discharge provision, so that the transistor 81 and related conductor resistor portions may be omitted therefrom. The traling edge pulse output 94 (from differentiator 92) is shown coupled to each of the pulse width detector circuits where it is fed by line 84 (FIG. 4) in order to obtain outputs 87 therefrom where the corresponding pulse width is detected. The output 87 of the last pulse width detector 97 is used as an indicator that the correct sequence of pulses has been received.

The entire circuitry of FIG. 5 with the exception of one capacitor 78 for each pulse width detector corresponding charge rate determining resistors 79, and capacitors in the a.c. coupling stage 90 can be provided on one integrated circuit chip, again advantageously using CDI fabrication techniques.

I claim:

1. A security system transmitter comprising a high frequency wave generator for generating high frequency waves, first gating means operable to pass said high frequency waves, means for generating a group of pulses of predetermined frequency to operate the gating means by their sequential application including a charging circuit having a plurality of resistors, means for connecting each resistor in turn to determine the time constant of the charging circuit and the duration of each pulse generated whereby said group has a unique identity specified by the particular duration of the constituent pulses, and a tuned circuit aerial for transmitting pulses of high frequency waves passed by the gating means.

2. A security system transmitter according to claim 1 wherein said charging circuit includes a single capacitor and means for connecting the resistors in alternative feed paths to said single capacitor.

3. A security system transmitter according to claim 2 wherein said means for determining the particular durations include a source of clock pulses, second gating means connected to receive said clock pulses and enable said feed paths sequentially one at a time on consecutive clock pulses, a differential amplifier connected to compare a reference voltage and the voltage on the capacitor so that its output will change when the capacitor reaches a predetermined voltage, means for discharging the capacitor between said amplifier output change and the next clock pulse and means for connecting the output of said amplifier to said first gating means.

4. A security system transmitter according to claim 3, wherein all components including at least one integrated circuit chip are mounted on the same board as carries the aerial.

5. A security system high frequency receiver responsive to a received group of pulses of predetermined frequency and having a unique identity specified by the particular duration of the constituent pulses comprising means for detecting the start and finish of each of successive pulses of said group of pulses, a plurality of preset pulse width recognition stages each said state connected to receive the outputs of said means for detecting corresponding to the start and finish of each of said successive pulses, and means for providing an output only if all of the stages have indicated reception of a pulse having a width corresponding to their presets.

6. A security system receiver according to claim 5, wherein each pulse width recognition stage includes means for establishing a predetermined tolerance time interval during which a received pulse should terminate to correspond with the preset of that stage.

7. A security system receiver according to claim 6, wherein each pulse width recognition stage comprises a capacitor and a particular feed resistor, and two differential amplifiers each connected to receive capacitor voltage but supplied with different reference voltage to give said predetermined tolerance interval between states of the amplifier outputs.

8. A security system receiver according to claim 7, comprising means for sequentially enabling the pulse width recognition stages for successively received pulses;

9. A security system receiver according to claim 8, wherein the sequential enabling means is arranged to utilise outputs of each pulse width recognition stage to enable the next such stage the last stage output then serving to indicate whether all stages have indicated correspondence with their presets.

10. A security system comprising a transmitter including a high frequency wave generator means for generating a group of pulses of predetermined frequency, said group having a unique identity specified by the particular duration of its constituent pulses, means for determining the particular duration of said constituent pulses including a charging circuit having a plurality of resistors for determining the time constant of the charging circuit, a tuned circuit aerial, first gating means connected between the generator and the aerial, the gating means being sequentially operative to pass a predetermined number of pulses of generator output of durations set by correponding resistance values of said resistors, a high frequency receiver responsive to a received group of pulses of predetermined frequency having a unique identify, said receiver including means for detecting the start and finish of each of successive pulses of said group of pulses, a plurality of preset pulse width recognition stage, each said stage connected to receive the outputs of said means for detecting corresponding to the start and finish of each of said successive pulses, and means for providing an output only if all of the stages have indicated reception of a pulse width having a width corresponding to their presets.

11. A security system as set forth in claim 10 wherein said charging circuit includes a single capacitor and means for connecting the resistors in alternative feed paths to said single capacitor and wherein said means for determining the particular durations include a source of clock pulses, second gating means connected to receive said clock pulses and enable said feed paths sequentially one at a time on consecutive clock pulses, a differential amplifier connected to compare a reference voltage and the voltage on the capacitor so that its output will change when the capacitor reaches a predetermined voltage, means for discharging the capacitor between said amplifier output change and the next clock pulse and means for connecting the output of said amplifier to said first gating means.

12. A security system as set forth in claim 10, wherein each pulse width recognition stage includes means for establishing a predetermined tolerance time interval during which a received pulse should terminate to correspond with the preset of that stage and wherein each pulse width recognition stage comprises a capacitor and a particular feed resistor, and two differential amplifiers each connected to receive capacitor voltage but supplied with different reference voltage to give said predetermined tolerance interval between states of the amplifier outputs.

13. A security system as set forth in claim 12 further including means for sequentially enabling the pulse width recognition stages for successively received pulses, said sequential enabling means being arranged to utilize outputs of each pulse width recognition stage to enable the next such stage, the last stage output then serving to indicate whether all stages have indicated correspondence with their presets.

* * * * *